US006738373B2

(12) United States Patent
Turner

(10) Patent No.: US 6,738,373 B2
(45) Date of Patent: May 18, 2004

(54) WIRELESS COMMUNICATION DEVICE OPERABLE ON DIFFERENT TYPES OF COMMUNICATION NETWORKS

(75) Inventor: Simon Turner, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 89 days.

(21) Appl. No.: 10/075,044

(22) Filed: Feb. 11, 2002

(65) Prior Publication Data

US 2003/0152049 A1 Aug. 14, 2003

(51) Int. Cl.[7] ............... H04Q 7/38; H04L 12/56
(52) U.S. Cl. ............... 370/352; 370/331
(58) Field of Search .................. 370/351–356, 370/311, 318, 328, 331, 332, 342, 335, 310, 310.1, 310.2, 431, 441, 312, 338, 349; 455/436–444, 134, 522, 574

(56) References Cited

U.S. PATENT DOCUMENTS

| 4,901,307 A | | 2/1990 | Gilhousen et al. |
| 5,103,459 A | | 4/1992 | Gilhousen et al. |
| 6,011,960 A | * | 1/2000 | Yamada et al. ............ 455/77 |
| 6,526,131 B1 | * | 2/2003 | Zimmerman et al. .. 379/106.09 |
| 2002/0067714 A1 | * | 6/2002 | Crain et al. ............ 370/352 |
| 2003/0086411 A1 | * | 5/2003 | Vassilovski ............ 370/352 |

FOREIGN PATENT DOCUMENTS

| EP | 0 872 982 A1 | 10/1998 |
| WO | WO 02/47427 A2 | 6/2002 |
| WO | WO 02/065716 A2 | 8/2002 |

* cited by examiner

Primary Examiner—Ajit Patel
(74) Attorney, Agent, or Firm—Philip Wadsworth; Kent D. Baker; Sandra L. Godsey

(57) ABSTRACT

A hybrid access terminal is a Wireless Communication Device (WCD) capable of operating over different types of communication networks. An exemplary WCD operates on both IS-2000 and IS-856 networks, and is capable of inter-system handoffs between these two types of networks. Such capabilities enable the exemplary WCD to provide voice, data and short messaging services on IS-2000 networks, and also to provide high speed packet data service on IS-856 networks. A method of operating on different networks includes establishing a data session on the first network, detecting a request for a packet data service, handing-off the data session to a second network, detecting a dormancy of the data session, transitioning to a dormant state and initiating a Dormancy time-out period when the dormancy is detected, and monitoring both the first network and the second network for paging messages while in the dormant state.

31 Claims, 9 Drawing Sheets

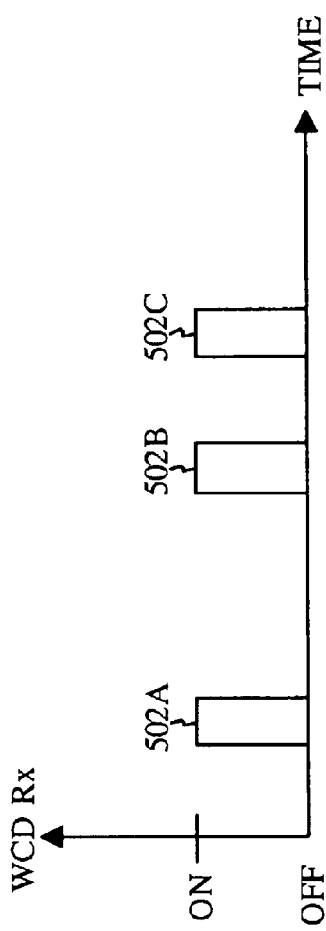
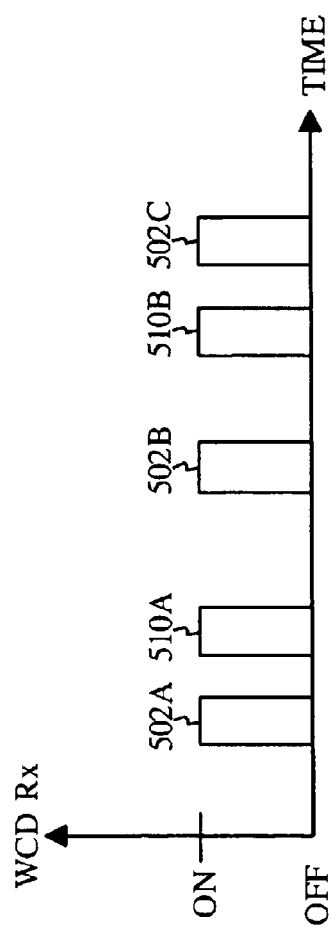

WIRELESS COMMUNICATION DEVICE OPERABLE ON DIFFERENT TYPES OF COMMUNICATION NETWORKS

BACKGROUND OF THE INVENTION

1. Field of the Invention

The present invention relates generally to Wireless Communication Devices (WCDs), and more particularly, to such a Wireless Communication Device capable of operating with different types of communication networks.

2. Background Art

As mobile communication systems become more prevalent in society, the demands for greater and more sophisticated service have grown. To meet the capacity needs of mobile communication systems, techniques of multiple access to a limited communication resource have been developed. The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems.

The use of CDMA techniques in a multiple access communication system is known in the art and is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS," assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM," also assigned to the assignee of the present invention.

Presently, there are many different types of communication networks offering services to users. Some types of communication networks are optimized for providing both voice and relatively slow data-rate data services to a user. Such communication networks include networks operating in accordance with International Standard (IS) 2000 (that is, IS-2000) or the Global System for Mobile (GSM) Communications standards, for example. On the other hand, other types of communication networks are optimized for providing efficient, relatively high-speed packet data services to the user. Such communication networks include High Data Rate (HDR) networks operating in accordance with IS-856 communication standards, for example.

The user typically accesses voice and/or data services associated with the different types of communication networks using a mobile terminal (referred to herein as a Wireless Communication Device (WCD)). However, conventional WCDs are typically capable of operating over only one type of communication network, such as with an IS-2000 network system, or alternatively, with an IS-856 network system. Therefore, such conventional WCDs do not individually provide optimized communication services to the user for both types of communication networks. As a result, the user may need to use multiple, different WCDs should the user wish to utilize the optimized services available on the different networks.

Therefore, there is a need for a WCD capable of operating over the above-mentioned different types of networks, thereby providing a user of the WCD with optimized voice and data services associated with the different types of networks.

A portable WCD is typically capable of operating on battery power. It is desirable for such a battery powered WCD to have as long a battery lifetime as possible. In the past, much effort has been expended to minimize WCD power dissipation, thereby extending the WCD battery lifetime. Therefore, in addition to the above-mentioned need to operate a single WCD on different types of networks, there is a related need to operate the WCD in a power efficient manner aimed at conserving battery power, and thus extending the WCD battery lifetime.

BRIEF SUMMARY OF THE INVENTION

The present invention is directed to a hybrid access terminal (also referred to as a WCD) capable of operating over different types of communication networks, and a method of operating the WCD on the different types of networks. An exemplary WCD of the present invention operates on both IS-2000 and IS-856 networks, and is capable of inter-system handoffs between these two types of networks. Such capabilities enable the exemplary WCD to provide voice, data and short messaging services on IS-2000 networks, and also to provide high speed packet data service on IS-856 networks. By supporting services on both types of networks, the WCD enables the user of the WCD to realize the best possible services for voice, data and short messaging, while also enabling network operators to realize the network capacity benefits that are achievable by overlaying IS-2000 and IS-856 systems, each of which is optimized for the type of services provided. The primary design drivers for the above-mentioned inter-system operation of the hybrid WCD include the following:

Support IS-2000 voice services and mobile directed short messaging services at any time, minimize call setup time, maximize network capacity, and maximize mobile standby time by conserving battery power.

The WCD of the present invention is capable of establishing data sessions on both a first network (such as an IS-2000 network) supporting voice and data services, and a second network (such as an IS-856 network) supporting packet data services. According to a method of the present invention, the WCD acquires the first network, and monitors a paging channel of the first network. Next, the WCD establishes a data session on the first network. Next, the WCD detects a request for a packet data service.

In response to detecting the request, the WCD hands-off the data session from the first network to the second network, thereby establishing the data session on the second network. Once the data session is established on the second network, the WCD detects a dormancy of the data session corresponding to a predetermined period of time during which data is not being exchanged between the WCD and the second network. The WCD initiates a Dual System Dormancy Timer in response to detecting the dormancy. The WCD monitors both a paging channel of the first network and a paging channel of the second network in response to detecting the dormancy. Then, the WCD monitors only the first network paging channel when the dormancy-timer expires.

According to an aspect of the present invention, the WCD comprises means for establishing the data session on the first network and means for detecting the request for the packet data service (PDS). The WCD also includes means for handing-off the data session from the first network to the second network when the PDS request is detected. The WCD also includes means for detecting the dormancy of the data session corresponding to the predetermined period of time that data is not being exchanged between the WCD and the second network. The WCD also includes a Dormancy Timer, and means for initiating the Dormancy Timer in response to detecting the dormancy. The WCD further includes means for monitoring both the paging channel of the first network and the paging channel of the second network in response to detecting the dormancy. The WCD also includes means, responsive to the Dormancy Timer, for monitoring only the first network paging channel when the Dormancy Timer expires.

Another aspect of the present invention is a computer program product comprising a computer usable medium having control logic stored therein for causing a processor of the WCD to control the WCD, such that the WCD is capable of establishing data sessions on both the first network supporting voice and data services and the second network supporting packet data services. The control logic comprises first computer readable program code means for causing the processor to establish the data session on the second network, second computer readable program code means for causing the processor to detect the dormancy of the data session corresponding to the predetermined period of time that data is not being exchanged between the WCD and the second network, third computer readable program code means for causing the processor to initiate the Dormancy time-out period when the dormancy is detected, fourth computer readable program code means for causing the processor to monitor both the paging channel of the first network and the paging channel of the second network when the dormancy is detected, and fifth computer readable program code means for causing the processor to monitor only the first network paging channel when the Dormancy time-out period expires.

Terms and Definitions

Dormant mode—a data session is active but no air-link resources are assigned.

Hybrid access terminal—an access terminal capable of providing service on first and second different types of networks, such as IS-2000 and IS-856 networks.

HDR—High Data Rate wireless packet data service technology.

IS-2000—standard for spread spectrum communication systems.

IS-856—standard for high speed spread spectrum packet data systems; also refers to HDR.

PDSN—packet data serving node.

Slotted operation—WCD idle state operation that enables improved power conservation.

Radio Access Network (RAN)—the first or second network over which the WCD can communicate, such as an IS-2000 network or an IS-856 network, for example.

Unicast Access Terminal Identifier (UATI)—the UATI is a unique number that is assigned to the WCD by a network (such as an IS-856 network system) upon the establishment of a new session between the network and the WCD, to identify the WCD over the course of the session.

Data Rate Control (DRC) channel—a reverse-link physical channel defined as part of the IS-856 physical layer and used by the WCD to indicate to the network (for example, an IS-856 network system) a maximum data rate the WCD is able to receive at any instant in time.

BRIEF DESCRIPTION OF THE DRAWINGS/ FIGURES

The features, objects, and advantages of the present invention will become more apparent from the detailed description set forth below when taken in conjunction with the drawings in which like reference characters identify the same or similar elements throughout and wherein:

FIG. 5A is an exemplary timeline of WCD slotted operation on a first network of the environment of FIG. 1;

FIG. 5B is an exemplary timeline of WCD dual-system slotted operation on first and second networks of the environment of FIG. 1;

DETAILED DESCRIPTION OF THE INVENTION

The present invention is described in the context of a WCD capable of operating in digital only environments, or in combined analog and digital environments. The WCD architecture and operation described below is applicable to code division multiple access (CDMA) operation as well as other digital communication formats including TDMA, FDMA, GSM, etc.

Example WCD Architecture and Basic Operation

Figure 1:
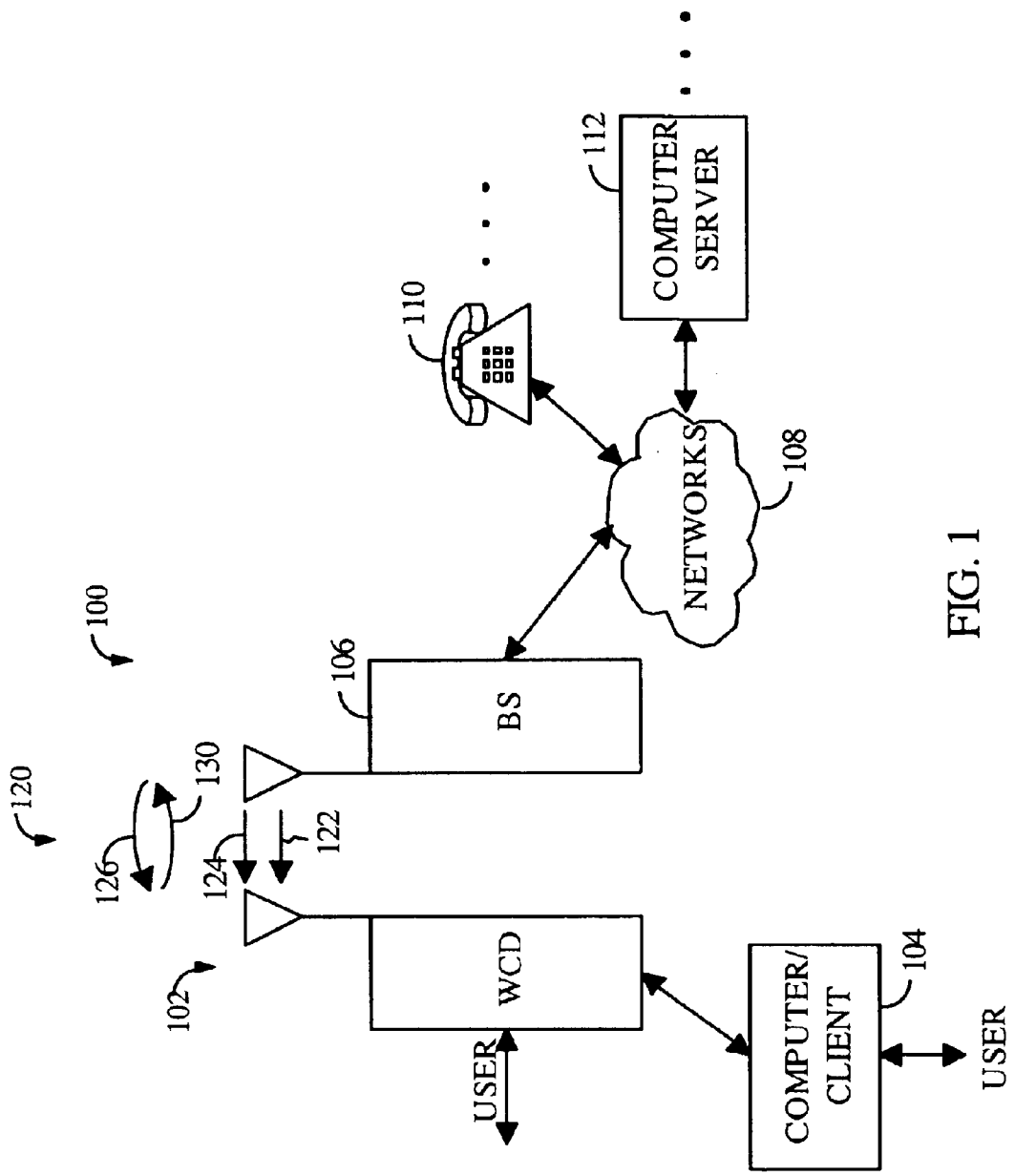
FIG. 1 is a block diagram of a network environment in which a Wireless Communication Device (WCD) of the present invention can operate.

FIG. 1 is a block diagram of an example network environment 100 in which a hybrid access terminal, such as an WCD 102 of the present invention can operate. Hybrid access terminal 102 is a WCD capable of operating on/with different types of communication networks. Hybrid access terminal 102 (also referred to as WCD 102) can communicate on/with a first network operating in accordance with a first set of communication standards, and in addition, WCD 102 may communicate on/with a second network operating in accordance with a second, different set of communication standards. In an exemplary configuration of WCD 102, the WCD 102 can provide voice, data, and data messaging services to a user of the WCD 102 over networks operating in accordance with IS-2000 standards. In addition, WCD 102 can provide packet data services to a user of the WCD 102 over networks operating in accordance with IS-856 standards. For illustrative purposes, the present invention is described in the context of WCD 102 operating on IS-2000 and IS-856 networks. However, it is to be understood that the present invention is not limited to such illustrative networks. Other configurations of WCD 102 can connect to and operate on other combinations of networks, including networks operating in accordance with GSM standards, for example.

WCD 102 can operate on each of the above-mentioned first and second different types of networks, and is also capable of handing-off data calls between the first and second network, in the manner described below. These capabilities of WCD 102 enable a single access terminal (that is, WCD 102) to provide voice, data and short messaging services on the first network, and also to provide efficient, high-speed packet data services on the second network.

With reference again to FIG. 1, example environment 100 includes a computer 104 coupled to WCD 102. The user can access data services through computer 104. System 100 also includes a base station 106 coupled to multiple networks 108. Base station 106 operates in accordance with either the first communication standards (for example, IS-2000) or the second communication standards (for example IS-856). Networks 108 can include the Public Switched Telephone Network (PSTN), multiple Packet Switched Data Networks, the Internet, and so on. One or more of networks 108 operate in accordance with the first communication standards, and one or more of the networks operate in accordance with the second communication standards. Voice terminals 110 and data terminals 112, such as computer/servers, can be connected to base station 106 through networks 108.

With regard to data services, base station 106 is coupled to one or more packet data serving nodes (PDSNs) included in networks 108. A PDSN routes data packets received from base station 106 to an appropriate data network in data networks 108, and thus, to a destination device (such as computer 112). Additionally, the PDSN routes data packets from a network source (such as computer 112), and destined for WCD 102, to base station 106.

WCD 102 inter-operates with base station 106, and thus with networks 108 and terminals 110 and 112, over an air interface 120 between WCD 102 and base station 106. Air interface 120 operates in accordance with the first or second communication standard depending on whether base station 106 is part of the first or second network. In an exemplary configuration, air interface 120 includes a pilot channel 122 transmitted by base station 106, a paging channel 124 transmitted by base station 106, a forward-link traffic channel 126 transmitted by base station 106, and a reverse-link traffic channel 130 transmitted by WCD 102.

Figure 2:
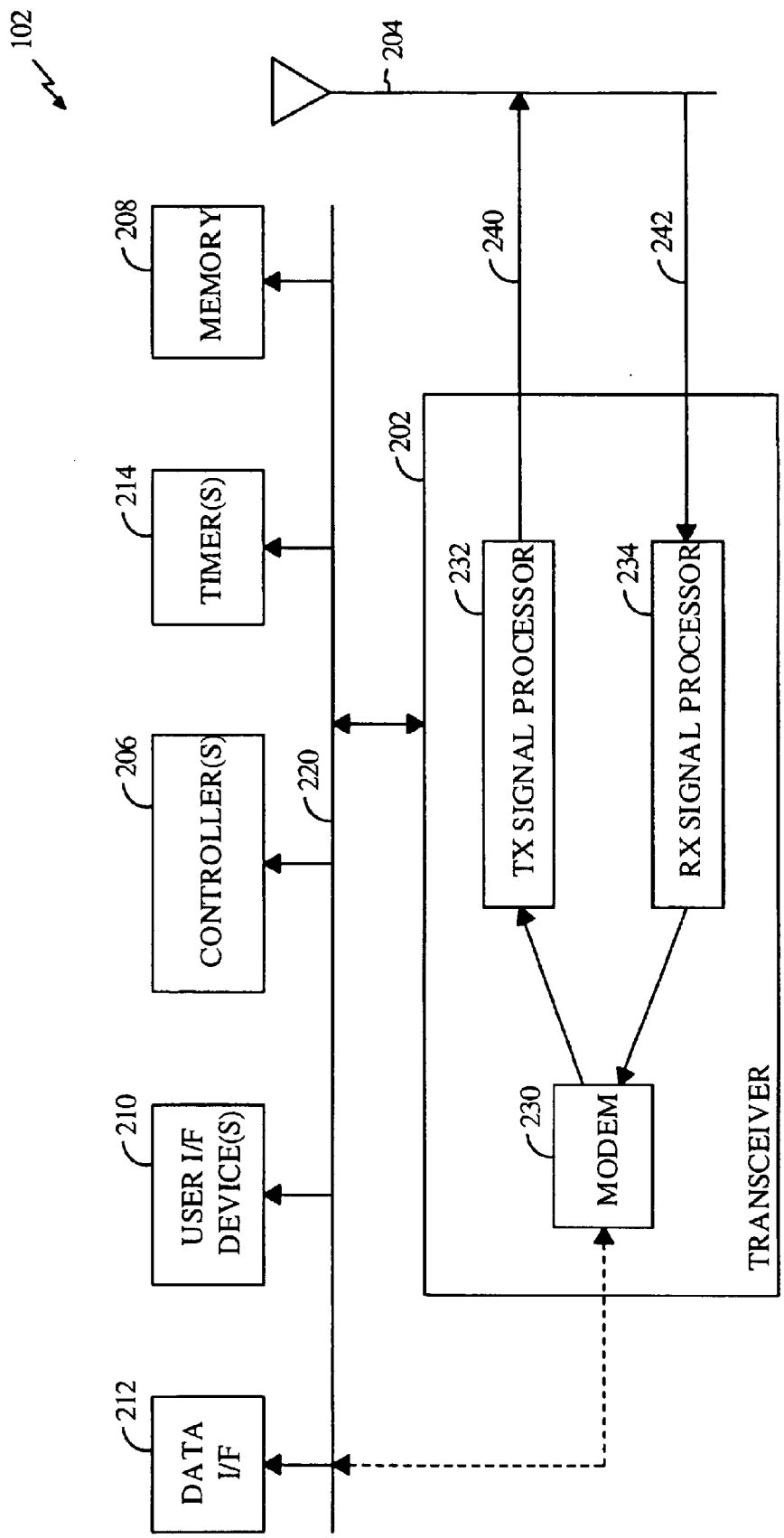
FIG. 2 is a block diagram of the WCD from FIG. 1.

FIG. 2 is a block diagram of WCD 102, according to an embodiment of the present invention. WCD 102 includes a transmitter-receiver (transceiver) section 202 coupled to an antenna 204. WCD 102 also includes a controller (or a plurality of controllers) 206, a memory 208, user interface devices 210, a data interface 212, and one or more timers 214, all coupled to one another, and to transceiver 202, over a common data bus 220. The above-mentioned functions/elements of WCD 102 can exchange information/data with one another over data bus 220. Timers 214 includes a Dual-Dormancy Timer of the present invention, for establishing a Dormancy time-out period, as will be described in further detail below. Timers 214 can be part of controller 206 and can be implemented in hardware, software or a combination thereof. Controller 206 can program timers 214, start and stop the timers, and is responsive to an expiration of the timers.

Data interface 212 receives data from and transmits data to a computer (such as computer 104) coupled to the data interface. User interface devices 210 can include voice interface devices such as a speaker and a microphone, a keypad for entering information into WCD 102, and a display for displaying information to a user of device 102. Controller 206 controls the overall operation of WCD 102 and executes computer programs stored in memory 208. Memory 208 stores the computer programs along with information necessary for the operation of WCD 102.

Transceiver 202 includes a modem 230 coupled with a transmit signal processor 232 and a receive signal processor 234. Modem 230 includes analog and/or digital modulator and demodulator functions for modulating and demodulating voice and data based signals in accordance with the communication standards associated with the first and second networks, mentioned above. For example, modem 230 provides voice and/or data signal formatting, encoding, interleaving, modulating functions, and decoding, de-interleaving, and demodulating functions.

Transmit signal processor 232 includes digital and/or analog signal processing components for frequency-up converting modulated data from modem 230. Transmit signal processor 232 provides a transmit signal 240 to antenna 204. Antenna 204 provides a received signal 242 to receive signal processor 234. Receive signal processor 234 frequency down-converts received signal 242 and provides a down-converted received signal to modem 230. Antenna 204 transmits signals to and receives signals from base station 106 over air interface 120.

Figure 3:
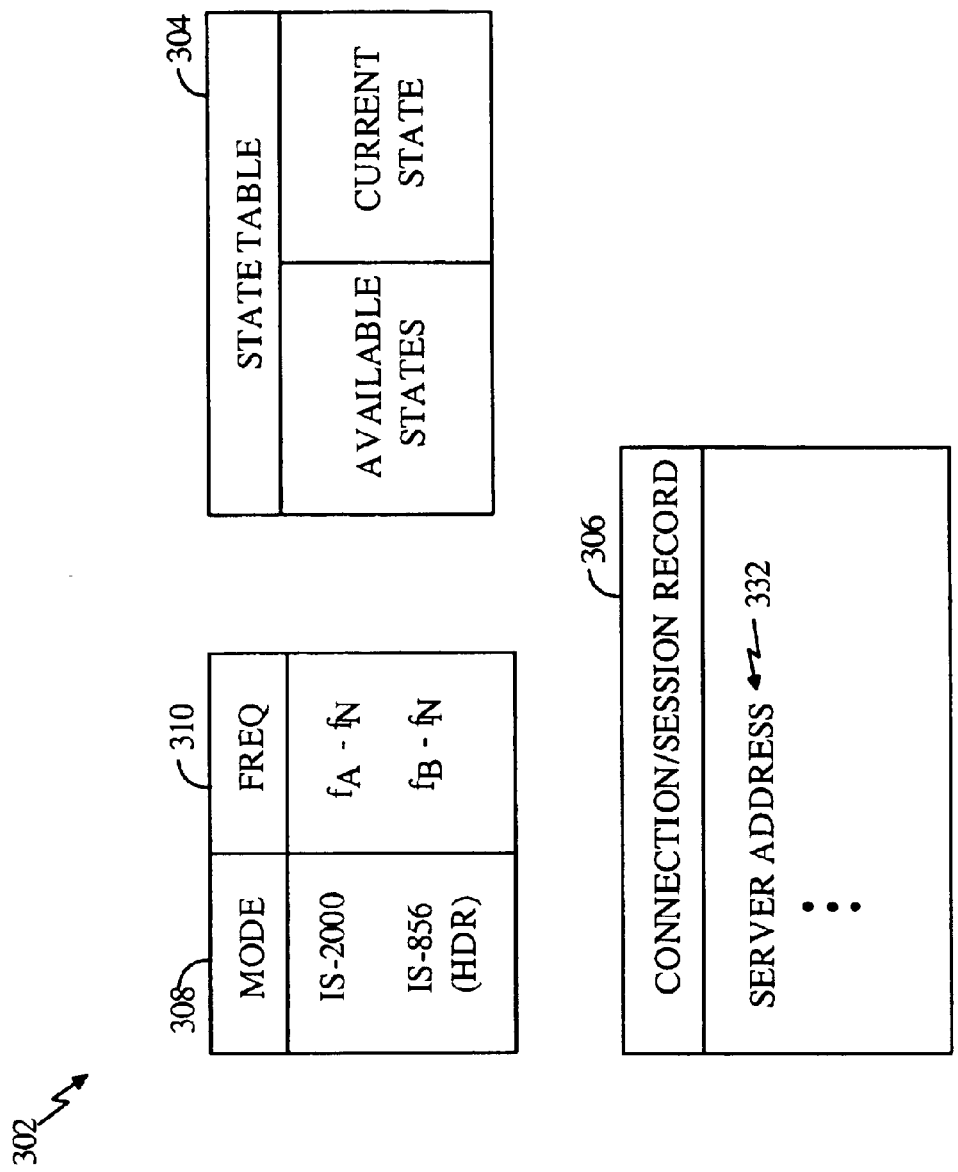
FIG. 3 is an illustration of various example operational tables stored in a memory of the WCD of FIG. 1.

FIG. 3 is an illustration of various example operational tables stored in memory 208 of WCD 102. The following tables are stored in memory 208: a mode-frequency table 302 (also referred to as a system table), a state table 304, and a connection/session record table 306. WCD 102 uses mode-frequency table 300 to acquire a system associated with networks 108. Mode-frequency table 302 includes a mode column 308 and a frequency column 310. Mode column 308 lists the types of network systems WCD 102 can acquire and operate on. For example, mode column 308 can include entries identifying various IS-2000 systems and HDR systems. Frequency column 310 identifies transmit and receive signal frequencies associated with each of the system/modes listed in mode column 308.

WCD 102 can operate in one of a plurality of available operational states, as will be described further below. State table 304 includes entries identifying such available operational states of WCD 102, an entry identifying a current operational state of the WCD 102, and entries identifying next valid operational states of the WCD 102. The state table also includes entries identifying operational state related events used to transition the WCD 102 from the current operational state to the next valid operational state.

When WCD 102 establishes a call/connection with a device associated with networks 108, such as with one of voice sets 110 or data terminals 112, the WCD 102 establishes and maintains information relating to the connection in connection/session record table 306. Such information can include a network server address for the terminal/server with which computer 104 (connected to WCD 102) is currently exchanging data, for example. Such information can also include a UATI assigned to WCD 102 for a current data session.

Controller 206 dynamically configures transceiver 202 according to the operating mode required of WCD 102. Controller 206 configures transceiver 202 based on information stored in memory 208, including information in system and state tables 302 and 304, for example. Therefore, controller 206 can configure the transmit and receive frequencies of WCD 102, and the receive and transmit signal processing modes, in accordance with first and second network communication standards.

Figure 4:
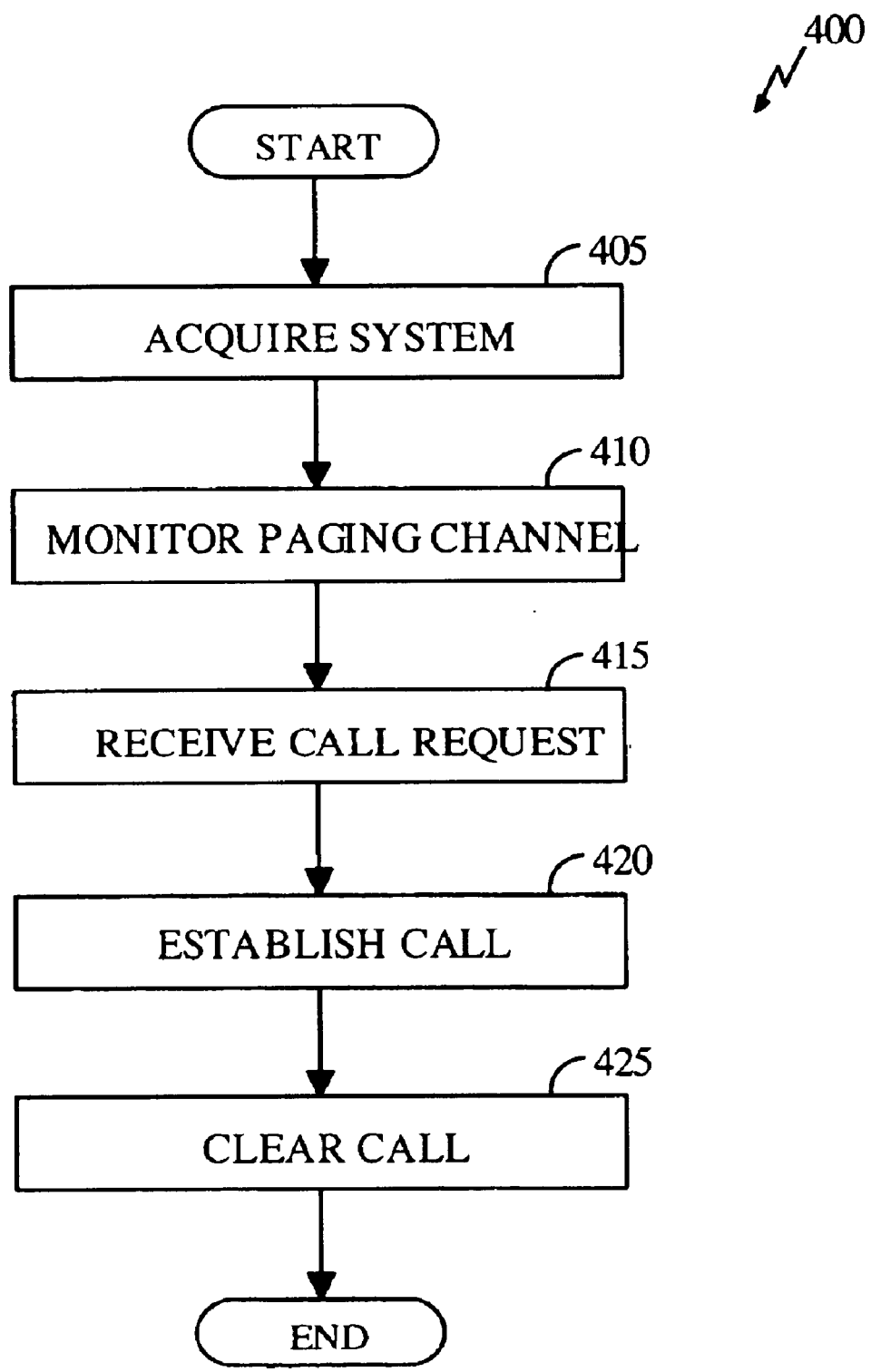
FIG. 4 is a flowchart of an example method of operating the WCD of FIG. 1 on one of a first network and a second network included in the example network environment of FIG. 1.

FIG. 4 is a flowchart of an example method 400 of operating WCD 102 on one of the first and second networks, included in networks 108. Method 400 is initiated in response to an initiating event, such as when WCD 102 is powered-on. At an initial step 405, WCD 102 acquires a system associated with networks 108. An example sequence of operations performed by WCD 102 to acquire a system includes accessing entries in mode-frequency table 302, frequency tuning-to and demodulating a signal (such as a pilot channel) transmitted by base station 106, synchronizing WCD 102 to the base station signal, and acquiring from the signal a System ID (SID) associated with a system included in networks 108. Once a system has been acquired, at a next step 410, WCD 102 monitors paging channel 124 for incoming call requests from the acquired one of the first and second networks. This is referred to as slotted operation, and will be described further below.

At a next step 415, WCD 102 receives a call request either over paging channel 124, or from the user of WCD 102 (for example, through computer 104 or keypad entry). In response to the call request, at a next step 420, WCD 102 establishes a call connection between itself and a called-to (or calling) device coupled to network 108, such as terminal 110 or 112. Establishing such a call involves an exchange of signaling information between WCD 102 and base station 106 over air interface 120. Once the call is established, call data (that is, voice data or computer data) is exchanged between WCD 102 and base station 106 over traffic channels 126 and 130. This is referred to as an active air interface link.

At a next step 425, the call connection is cleared in response to a local request to clear the call received from the user or from such a clear request from the called-to (or calling) terminal associated with networks 108.

WCD Operational Overview

As mentioned above, WCD 102 can operate in different operational states. An exemplary set of primary operational states includes the following states:

idle, no system acquired;

idle on the first network (for example, IS-2000) system, no data session;

idle on the first network (for example, IS-2000) system, dormant data session;

idle on the first and second network (for example, IS-856 and IS-2000) systems simultaneously, dormant data session;

active on the first network (for example, IS-2000) system; and active on the second network (for example, IS-856) system and idle on the first network (for example, IS-2000) system.

WCD 102 is considered to be idle if it does not currently have an active connection over the air interface and is not in the process of establishing a connection. WCD 102 is considered to be dormant if it is idle and has an active data session negotiated with a PDSN in the access network, as will be further described below. To optimize the use of the air interface resource for packet data service, WCD 102 is only assigned air interface resources (for example, traffic channels 126 and 130) when data needs to be transferred. When there is no data to transfer, the corresponding air interface resources are freed (that is, released) and WCD 102 becomes dormant. The data session state (that is, operational state) is maintained by both WCD 102 and the network (of networks 108, for example) while the WCD 102 is dormant to allow future data transfers without requiring renegotiation of a new data session.

To maximize standby time while idle, WCD 102 performs slotted operation as specified in the corresponding air interface standard (for example, IS-2000 or IS-856). Thus, when idle, WCD 102 can receive overhead messages over the air interface at specified time intervals, and conserve battery power by placing electronic components into a low power state when not receiving.

When idle for long durations, WCD 102 performs slotted operation on the IS-2000 system only. This provides the standby time optimization achieved by IS-2000 slotted operation, and allows mobile originated and mobile terminated IS-2000 voice, data and short messaging services to be initiated without any impact to the call setup time achievable by an IS-2000 mobile. Initiation of a data connection that requires handoff to an IS-856 system will incur some additional delay for the initial connection setup as required for the IS-2000 to IS-856 handoff operation, as will be described in more detail below.

Once WCD 102 has handed off to an IS-856 system. WCD 102 continues to perform slotted operation on the IS-2000 system to receive pages for voice or short messaging services. When dormant on an IS-856 system, WCD 102 also performs slotted operation on the IS-856 system to support fast connection setup for packet data service on the IS-856 system. Mobile originated IS2000 voice and short messaging services are also supported by WCD 102 operating in this state, but will incur some additional delay for call setup as required for the IS-856 to IS-2000 handoff operation.

Since simultaneous slotted operation on both the IS-2000 and IS-856 systems has a greater impact on standby time than slotted operation on a single system, the amount of time that WCD 102 spends performing simultaneous slotted operation while dormant on an IS-856 system is limited. If WCD 102 has been dormant on an IS-856 system for too long, the WCD 102 will revert to slotted operation on the IS-2000 system only. The amount of time allowed for simultaneous slotted operation on the IS-2000 and IS-856 systems may be a service provisioning item.

When active on an IS-856 system, WCD 102 continues to perform slotted operation on the IS-2000 system to receive pages for voice or short messaging services. During this mode of operation, WCD 102 periodically tunes to the frequency of the IS-2000 system to receive the appropriate paging slot, and then tunes back to the IS-856 frequency to resume the active data session.

The types of handoff that WCD 102 may perform are the following:

IS-2000 to IS-2000;

IS-856 to IS-856;

IS-2000 to IS-856; and

IS-856 to IS-2000.

The details for handoff between systems of the same type are addressed in the corresponding standards and are discussed no further. Details for inter-system handoff will be described below.

Slotted Operation

IS-2000 Only Slotted Operation

FIG. 5A is an exemplary timeline of first network system only WCD 102 slotted operation (for example, IS-2000 only slotted operation), as performed in step 410 of method 400, for example. During such slotted operation on the first network system, WCD 102 monitors the first network paging channel (for example, paging channel 124). In the timeline of FIG. 5A, the vertical axis represents the ON or OFF state of receiver circuitry in transceiver 202, while the horizontal axis represents time. Slots 502a-502c represent time-periods when WCD 102 is frequency-tuned to paging channel 124. During time slots 502a-502c, WCD 102 can receive paging messages from networks 108. In the exemplary configuration of WCD 102 described above, the WCD 102 operates in accordance with the IS-2000 requirements for slotted operation.

The IS-2000 standard does not include support for identification of neighboring IS-856 systems (that is, second network systems). As a result, WCD 102 may not have current information about neighboring IS-856 systems when attempting to handoff a data call to an IS-856 system. If WCD 102 does not have current information about neighboring IS-856 systems when attempting handoff to an IS-856 system, the WCD 102 may need to search for a local IS-856 system and/or establish a new session on the IS-856 system to complete the handoff operation. Alternatively, to reduce the time required for handoff at the expense of standby time, WCD 102 may perform off-frequency IS-856 neighbor searching to maintain current information about neighboring IS-856 systems.

IS-2000 and IS-856 Dual System Slotted Operation

WCD 102 is capable of performing slotted operation on the first network and the second network, simultaneously. This is referred to as dual system slotted operation. For example, when dormant on an IS-856 system, WCD 102 monitors the IS-856 control channel for IS-856 page messages, and also monitors the IS-2000 paging channel for IS-2000 page messages. This allows WCD 102, when dormant on an IS-856 system, to resume data service on the IS-856 system, and also to receive incoming voice and short message services on the IS-2000 system.

FIG. 5B is an example timeline illustration of such dual-system slotted operation. Slots 502a-502c correspond to slotted operation on the first network (for example, IS-2000) while slots 510a and 510b correspond to slotted operation on the second network (for example, IS-856).

Provisions in the IS-856 standard make it possible for WCD 102 to monitor both systems without missing pages on either system. If WCD 102 receives a page message from the IS-2000 system, then the WCD 102 performs the necessary call setup on the IS-2000 system. If concurrent services are supported by WCD 102, the data session may also be handed off to the IS-2000 system to be continued concurrently with the voice service.

Since dual system slotted operation has a greater impact on overall standby time than single system slotted operation, the time spent monitoring both systems while WCD 102 is dormant is limited through the use of the Dual System Dormancy Timer, mentioned above. WCD 102 initiates the Dual System Dormancy Timer when the WCD 102 begins dual system slotted operation. If the Dual System Dormancy Timer expires, then WCD 102 hands-off to the IS-2000 system and begins IS-2000 only slotted operation. If WCD 102 enters the IS-856 connected state or hands-off to the IS-2000 system while the Dual System Dormancy Timer is active, then the dual system dormancy timer is stopped and reset.

IS-2000 Slotted Operation During IS-856 Connected State

When operating in the connected state on an IS-856 system, WCD 102 monitors the IS-2000 paging channel in addition to sending and receiving data traffic on the IS-856 system. This allows WCD 102, with an active data connection to the IS-856 system, to receive incoming voice and short messaging services on the IS-2000 system.

To monitor the IS-2000 paging channel, WCD 102 periodically tunes to the IS-2000 system to monitor the corresponding paging channel slot according to a slot cycle index of the IS-2000 system. If WCD 102 receives a page message from the IS-2000 system, the WCD 102 performs the necessary call setup on the IS-2000 system. In another exemplary configuration of WCD 102 capable of supporting concurrent first and second network services, the active data session may be handed off to the IS-2000 system to be continued concurrently with the voice service. In the event a call is setup on the IS-2000 system, WCD 102 will not return to the IS-856 system at the end of the IS-2000 paging slot. This should cause the IS-856 access network to treat the extended absence of WCD 102 as an extended fade, and the IS-856 access network will free the resources allocated to the WCD 102.

To avoid a negative impact to the forward link capacity of the IS-856 system, WCD 102 will set a DRC channel to NULL prior to tuning to the IS-2000 system to monitor the IS-2000 paging channel. By setting the DRC channel to NULL prior to tuning to the IS-2000 system, WCD 102 ensures that the IS-856 system will not schedule packets for that WCD 102 while it is monitoring the IS-2000 paging channel. Upon returning to the IS-856 system, WCD 102 will resume normal DRC operation to resume the IS-856 data connection.

Example Dual-Network Environment and Operation

Figure 6:
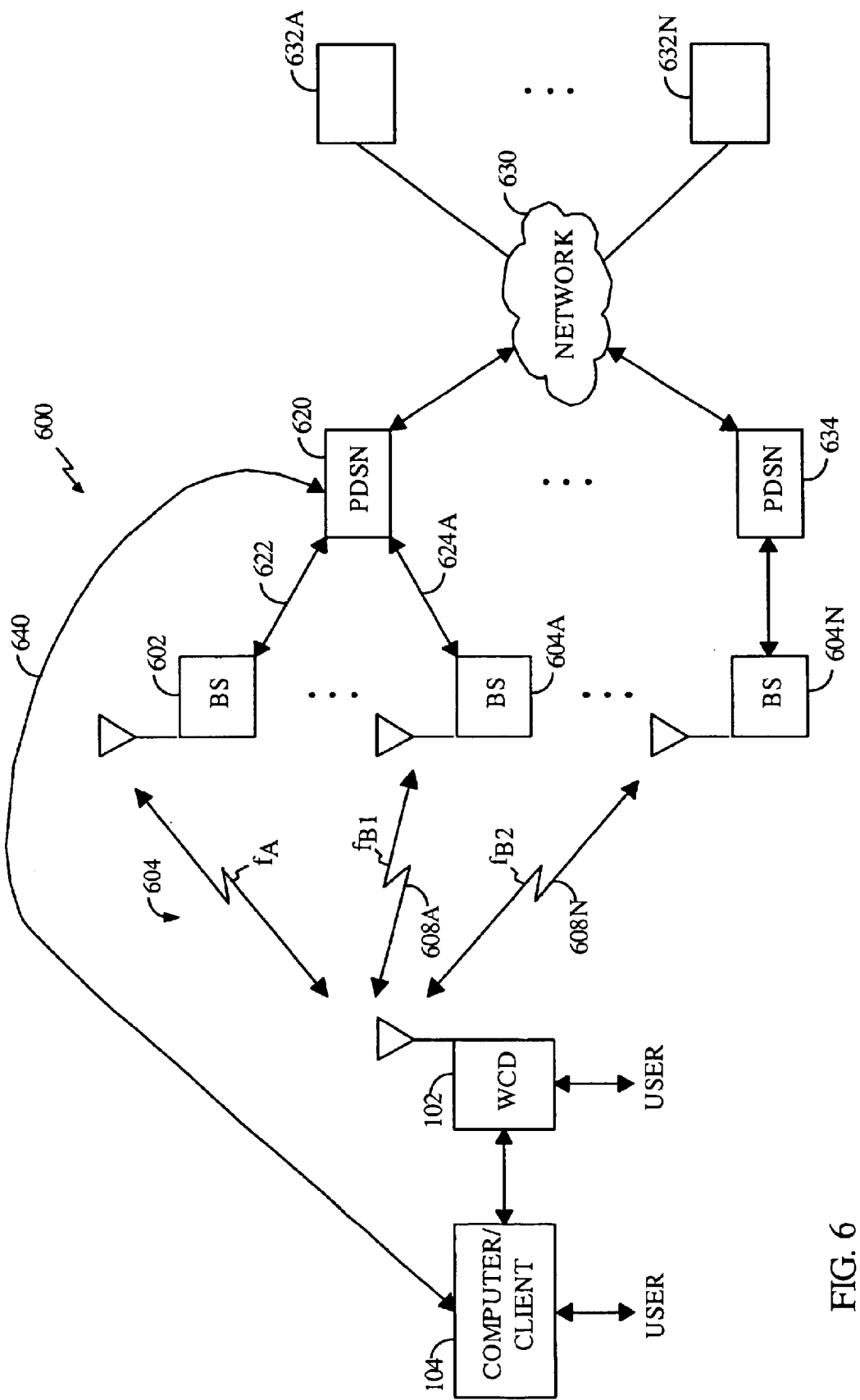
FIG. 6 is a block diagram of an example dual-network environment in which the WCD of FIG. 1 can operate.

FIG. 6 is a block diagram of an example dual-network environment 600 in which WCD 102 can operate. In the example environment of FIG. 6, WCD 102 inter-operates with a first network, such as an IS-2000 compatible network, and a second network, such as a HDR compatible network. WCD 102 communicates with a first network (for example, IS-2000 compatible) base station 602 over an associated air interface 604. WCD 102 also communicates with second network (for example, HDR compatible) base stations 604a–604n over associated air interfaces 608a–608n.

First network base station 602 and second network base station 604a are each coupled to a common PDSN 620 over respective communication interfaces 622 and 624. Common PDSN 620 is coupled to a plurality of networks 630 including the Internet, and other packet switched data networks. Computer terminals/servers 632a–632n are also coupled to networks 630. Second network base station 604n is coupled to a PDSN 634, and in turn, PDSN 634 is coupled to networks 630.

Figure 7:
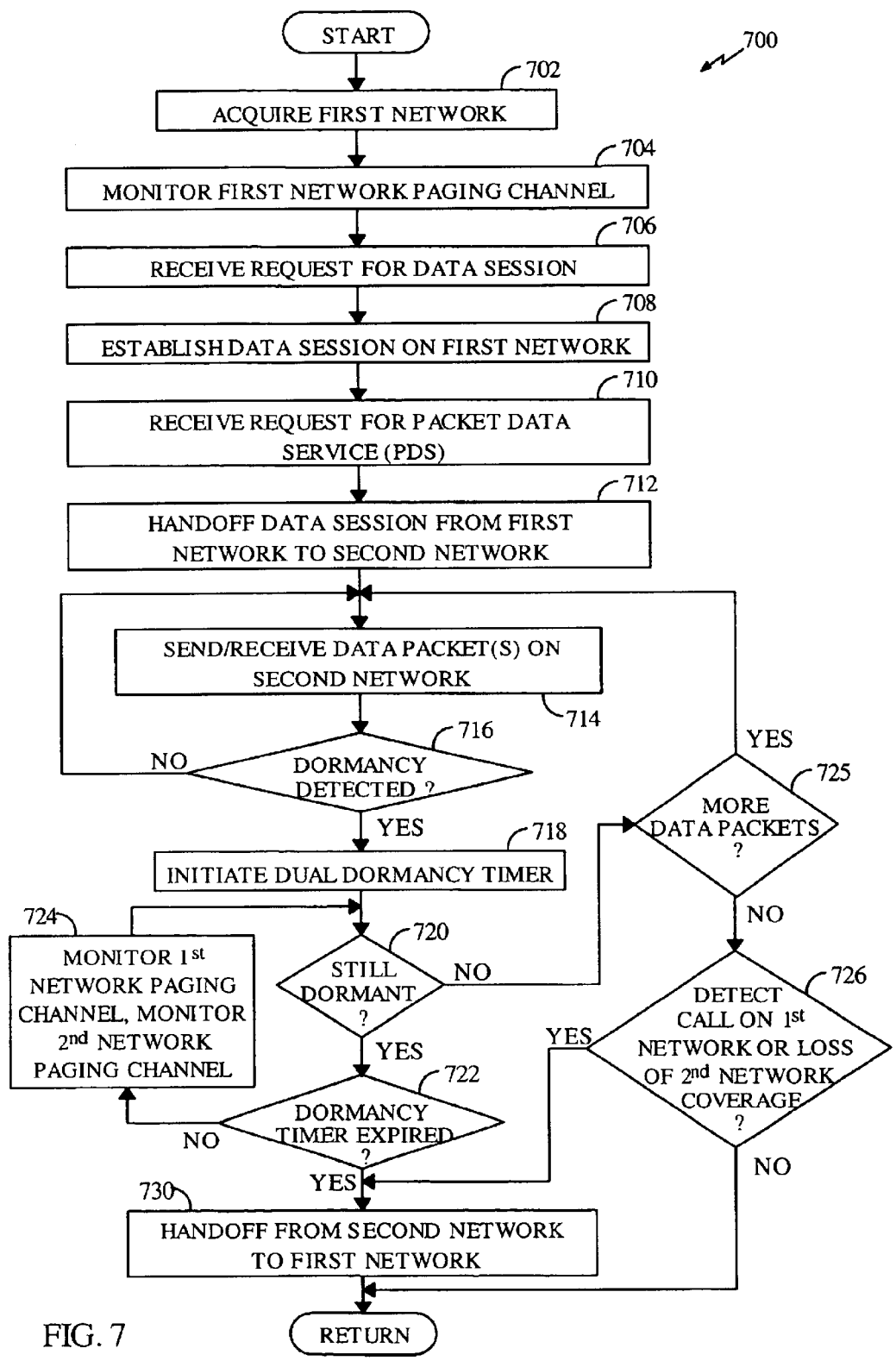
FIG. 7 is a flowchart of an example method of inter-operating the WCD of FIG. 1 with first and second different types of networks of the dual-network environment of FIG. 6.

FIG. 7 is a flowchart of an example method 700 of inter-operating WCD 102 with the first and second networks of dual-network environment 600. Method 700 is initiated in response to an initiating event such as powering-on WCD 102. At an initial step 702, WCD 102 acquires a system on the first network. For example, WCD 102 acquires an IS-2000 system.

At a next step 704, WCD 102 monitors a paging channel of the first network using single system only slotted operation, as described above.

At a next step 706, WCD 102 receives a data call request, that is, a request to establish a data session. The request may be received on the paging channel of the first network, or alternatively, the request may be received locally from computer 104 coupled to WCD 102.

In response to the request, WCD 102 facilitates establishing a data session between computer 104 and PDSN 620. WCD 102 exchanges signaling information with base station 602 over air interface 604, and further with PDSN 620. This establishes a physical layer connection between WCD 102 and PDSN 620, through base station 602. The physical layer connection includes: 1) a datalink between WCD 102 and base station 602 over air interface 604; and 2) a datalink between base station 602 and PDSN 620 over link 622. Once the physical layer connection is established, computer 104 and PDSN 620 negotiate with each other to establish a network layer data session 640 between the computer 104 and the PDSN 620. An exemplary data session 640 operates in accordance with a point-to-point protocol such as PPP. Establishing the data session between WCD 102 and PDSN 620 includes establishing a logical link between the PDSN and the first network (where the first network is also referred to as a Radio Access Network (RAN). The logical link is referred to as a PDSN RAN-PDSN (R-P) link. A PDSN R-P link exists for each active data session with a WCD (such as WCD 102) in the first network. Such R-P links are also used in the second network (for example, the IS-856 network system).

At a next step 710, WCD 102 receives a request for a packet data service (PDS). WCD 102 may receive the request from local computer 104. For example, the user of computer 104 may invoke an Internet web browser to solicit a home page from an Internet server, such as server 632*a* connected to networks 630. Alternatively, PDSN 620 may receive a request from a network computer to transmit data (such as a home page) to or solicit data from local computer 104. PDSN 620 can forward such a request to WCD 102 over the paging channel of the first network, through base station 602.

Responsive to the PDS request, at a next step 712, WCD 102, in concert with base station 602 and PDSN 620, performs a handoff of data session 640 from the first network to the second network. This handoff first establishes a physical layer connection between WCD 102 and PDSN 620 through base station 604*a* (that is, between WCD 102 and base station 604*a* over air interface 608, and between base station 604*a* and common PDSN 620 over link 624*a*). Then, to complete the handoff, the data session is transferred from the first network to the second network using an exchange of signaling between WCD 102 and PDSN 620 over the new physical connection.

At a next step 714, data packets are exchanged between computer 104 and PDSN 620 over the second network, that is, in accordance with the protocols established by the second network. The data packets are exchanged over the physical layer established between WCD 102, base station 604*a*, and PDSN 620.

At a next decision step 716, WCD 102 determines whether air interface 608 is dormant, that is, whether a dormancy of the air interface is detected. This occurs when data session 640 is established on the second network, but data packets are not being exchanged between WCD 102 and base station 604*a* for a predetermined period of time. In other words, when the data session is not active. The predetermined period of time is programmable in duration. A typical predetermined period can be on the order of a second or two. Base station 604*a* can signal dormancy to WCD 102. Alternatively, WCD 102 can make its own determination of dormancy, for example, by monitoring inactivity of the air interface. In either case, WCD 102 detects the dormancy of the data session corresponding to the predetermined period of time that data is not being exchanged between the WCD 102 and the second network. If dormancy is not detected, and further data packets need to be sent or received, then flow proceeds back to step 714.

However, if dormancy is detected at step 716, then flow proceeds to a next step 718. At step 718, the Dual System Dormancy Timer of WCD 102 is initiated (for example, reset and started) in response to detecting the dormancy. This initiates a Dormancy time-out period, which may be any programmed value, for example, ten, fifteen or thirty minutes. Next, WCD 102 executes a dormancy loop including decision steps 720 and 722, and a step 724. At next decision step 720, WCD 102 determines whether the air interface is still dormant. If the air interface is still dormant, then flow proceeds to next decision step 722. At decision step 722, WCD 102 determines whether the Dormancy Timer has expired (that is, determines whether the Dormancy time-out period has expired). If the Dormancy Timer has not expired, then flow proceeds to step 724. At step 724, WCD 102 monitors the paging channel on the first network and a paging channel on the second network. That is, WCD 102 performs dual system slotted operation, as described above. Then flow proceeds back to step 720. Therefore, WCD 102 executes the dormancy loop while the air interface and WCD 102 are in a dormant state, and the Dormancy Timer has not expired. If the Dormancy Timer expires at step 722, the flow proceeds to step 730, to handoff.

WCD 102 can exit the dormancy loop at either of decisions steps 720 and 722. If at step 720, it is determined that the air interface is no longer dormant, then flow proceeds to next decision steps 725 and 726, to determine what condition ended the dormancy. At decision step 725, WCD 102 determines whether more data packets are to be transmitted over air interface 608*a*. If more data packets are to be transmitted over air interface 608*a*, then flow proceeds back to step 714.

On the other hand, if WCD 102 determines there are no more packets to be transmitted, then flow proceeds to a next decision step 726. At decision step 726, WCD 102 determines whether:

a call is requested on the first network, for example, over the paging channel of the first network; or second network (IS-856) coverage has been lost.

If either case is true, then flow proceeds to a step 730 for a handoff back to the first network, as will be described below. On the other hand, if neither of these conditions is true, then flow proceeds to a return step. The return step can return flow control back to step 704, 706, or 708.

Returning again to decision step 722 in the dormancy loop, if WCD 102 determines the Dormancy Timer has expired, then flow proceeds to next step 730 for the handoff to the first network. At step 730, WCD 102, in concert with base station 602 and PDSN 620, performs a handoff from the second network, back to the first network.

Inter-System Handoff Operation
IS-2000 to IS-856 Handoff

At step 712 of method 700 described above, handoff from an IS-2000 network to an IS-856 network is performed by WCD 102 to utilize the more efficient IS-856 network for high data rate packet data service.

To handoff from an IS-2000 network to an IS-856 network, WCD 102 may or may not have to perform one or more of the following operations:

search for a neighboring IS-856 system;

negotiate a new IS-856 session with the IS-856 network;

negotiate a new IS-856 UATI with the IS-856 network;

negotiate a new data session with the PDSN connected to the IS-856 network; and transfer the PDSN R-P link for an existing data session to the IS-856 network.

The time required to perform a handoff from an IS-2000 network to an IS-856 network depends on the combination of the above operations that are required.

Figure 7A:
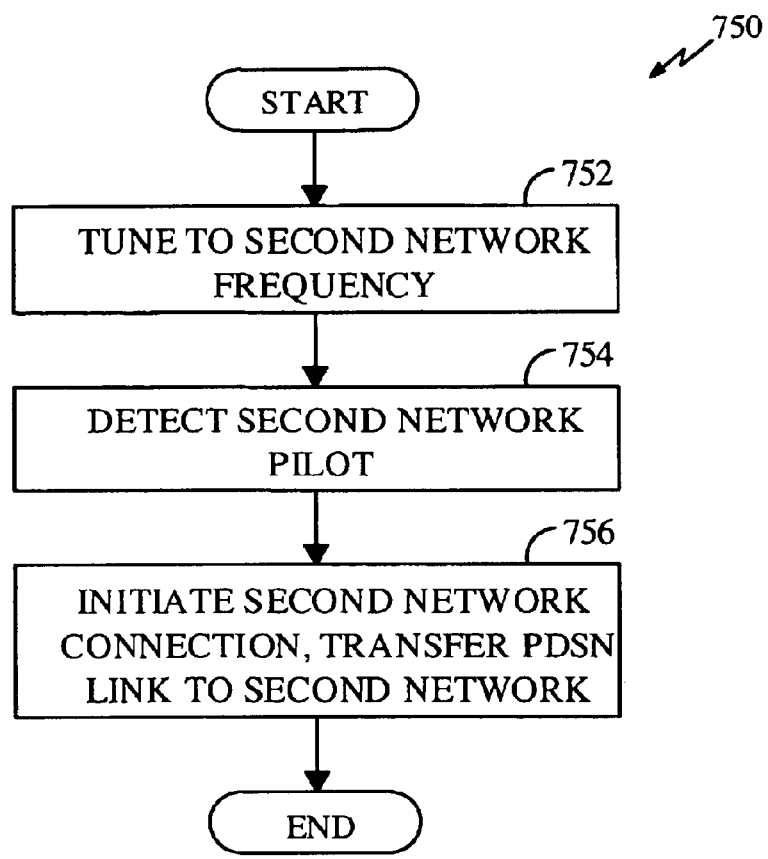
FIG. 7A is a flow chart of an example method of a WCD inter-system handoff from a first network to a second network of FIG. 6, according to a best case handoff scenario.

The scenario described above in connection with FIGS. 6 and 7 corresponds to a best case IS-2000 to IS-856 handoff scenario, wherein WCD 102 has current information about the location of the local IS-856 network, has an existing IS-856 session with a valid UATI, and has an existing data session with PDSN 620. Also, PDSN 620 has an R-P interface to the IS-856 network (over link 620). FIG. 7A is a flow chart of an example method 750 expanding on handoff step 712 of method 700, according to the best case handoff scenario. With reference to FIG. 7A, the handoff operation includes an initial step 752 of tuning to the frequency of the IS-856 network, a next step 754 of detecting the IS-856 network pilot, and a next step 756 of initiating an IS-856 connection, thus causing the PDSN R-P link to be switched to the IS-856 access network. In this case, the time required to complete the handoff operation depends on the following:

the time required to tune to the frequency of the hybrid access terminal;

the time required to detect the IS-856 network pilot;

the time required to open a connection on the IS-856 system; and the time required to switch the PDSN R-P link from the IS-2000 system to the IS-856 system.

The time required to tune to a specified frequency and search the complete Pseudo-Noise (PN) circle for an IS-856 system is approximately 0.5 seconds. Assuming that only one access probe is required to open a connection, the time required to open a connection is approximately 2 seconds, for example. The time required to switch the PDSN R-P link depends on the implementation of the access network and the PDSN.

In the worst case, WCD 102 does not have current information about the location of the local IS-856 network, does not have an existing IS-856 session with the IS-856 network, and does not have an existing data session with the PDSN that is connected to the IS-856 network. In this case, the handoff operation comprises searching for an acceptable IS-856 network, negotiating a new IS-856 session with the IS-856 access network, initiating an IS-856 connection, and negotiating a new data session with the PDSN. The amount of time required to complete this operation depends, in part, on the number of frequencies that must be searched to detect an IS-856 system, the number of access probes that are required to open a connection on the IS-856 system, the amount of negotiation that is required to establish a new session with the IS-856 network, and the amount of negotiation that is required to establish a new data session with the PDSN. These factors depend on the implementation of a given access network. For example, such a sequence of steps may be used to handoff the IS-2000 data session on PDSN 620 to PDSN 634, connected to IS-856 base 604n in FIG. 6.

IS-856 to IS-2000 Handoff

Handoff from an IS-856 network to an IS-2000 network (for example, at step 730 of method 700, described above) may be performed by WCD 102 in response to one of the following events:

IS-856 network coverage is lost (tested at step 726);

the WCD 102 Dual System Dormancy Timer expires (tested at step 722); and a request for mobile origination of an IS-2000 voice or short message service is received when operating on an IS-856 system (tested at step 726), since WCD 102 continuously monitors the IS-2000 paging channel, even when operating on the IS-856 network.

Figure 7B:
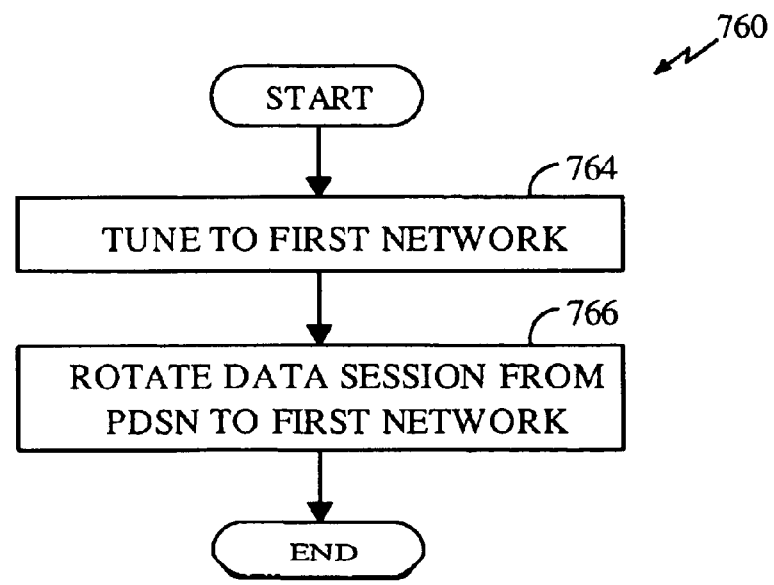
FIG. 7B is a flow chart of an example method of a WCD inter-system handoff from a second network to a first network of FIG. 6.

FIG. 7B is a flow chart of an example method 760 expanding on handoff step 730 of method 700. The handoff back to the IS-2000 system can include an initial step 764 of tuning back to the IS-2000 system, and a next step 766 of routing the data session from the PDSN (for example, PDSN 620) to the IS-2000 network. Then, WCD 102 exchanges data with base station 106, over air interface 604. Depending on the network architecture, it may be possible to continue to use the active data session. If a new data session must be negotiated as part of the handoff operation, then the time required to complete the handoff operation will be increased accordingly.

WCD State Diagram

Figure 8:
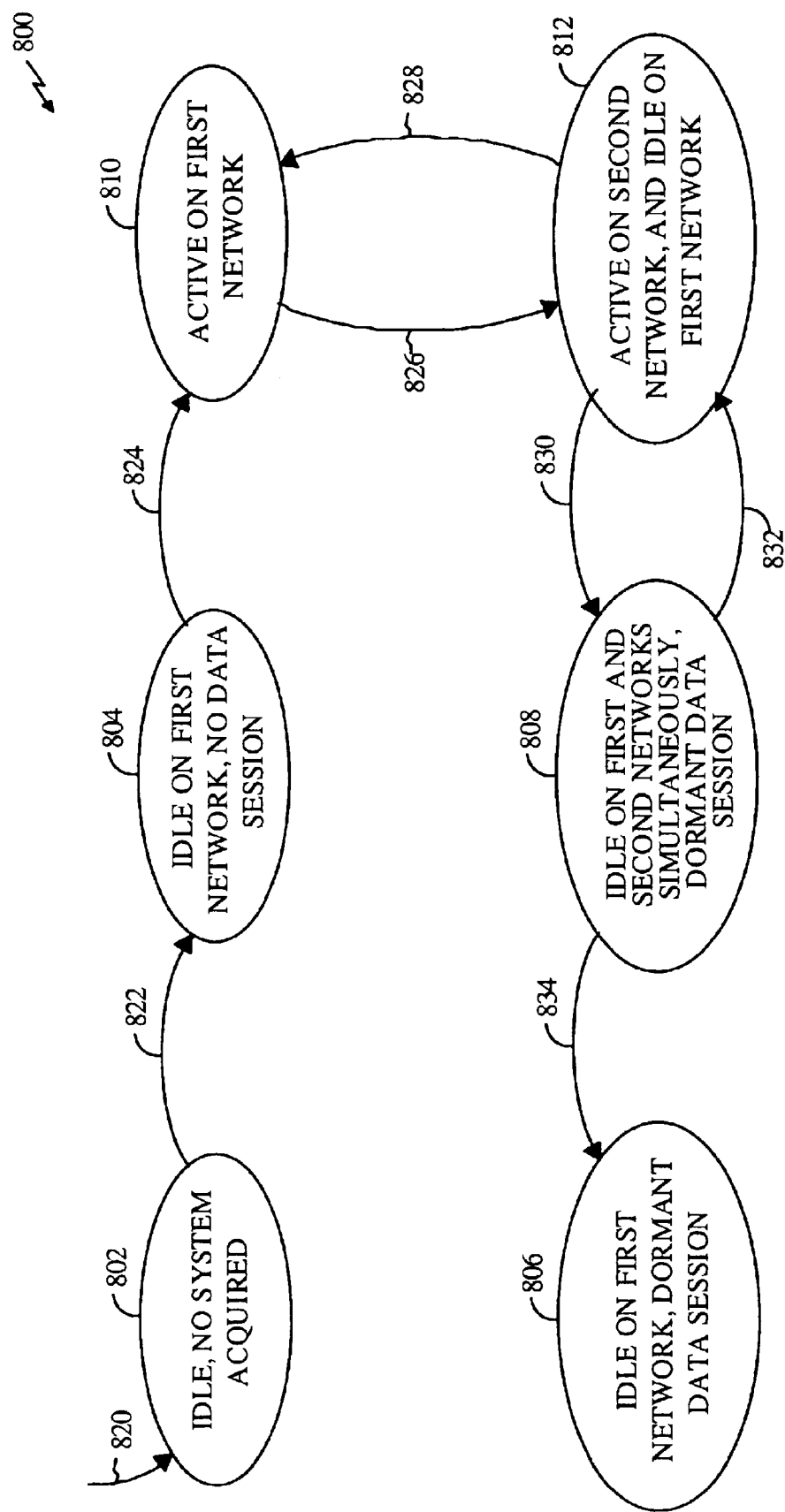
FIG. 8 is an example operational state diagram for the WCD of FIG. 1.

FIG. 8 is an example operational state diagram 800 for WCD 102. The following primary operational states of WCD 102 are illustrated in FIG. 8:

idle (state 802), no system acquired;

idle on first network system, no data session (804);

idle on first network system, dormant data session (state 806);

idle on first and second network systems simultaneously, dormant data session (state 808);

active on first network system (state 810); and active on second network system, and idle on first network system (state 812).

Various transitions between the various operational states are also depicted in FIG. 8. It is to be understood that the states and transitions depicted in FIG. 8 are exemplary, and that numerous variations/additions of/to the state diagram are possible.

Controller 206 in combination with state table 304, acts as a WCD state controller to sequence WCD 102 through, and maintain as appropriate, the above listed operational states of the WCD 102.

WCD 102 transitions to idle state 802 in response to an event 820, such as when WCD 102 initially powers-on.

WCD 102 transitions from idle state 802 to idle state 804 in response to an event 822, such as acquiring a first network system (step 702 of method 700). WCD 102 performs first network only slotted operation while in state 804.

WCD 102 transitions from idle state 804 to active state 810 in response to an event 824, such as establishing a data session on the first network in response to a call request, and then exchanging data with the first network (steps 706 and 708 of method 700).

WCD 102 transitions from active state 810 to state 812 (active on the second network, and idle on the first network) in response to an event 826, such as receiving a request for packet data services (step 710 of method 700). In state 812, WCD 102 exchanges data with the second network, and can perform first network system only slotted operation. WCD 102 transitions from state 812 back to state 810 in response to an event 828, such as receiving a call request over the paging channel of the first network.

WCD 102 transitions from state 812 to idle state 808 in response to an event 830, such as detecting a dormancy of the second network air interface. In dormant state 808, WCD 102 performs dual-system slotted operation. State 808 corresponds to the dormancy loop of method 700, including steps 720, 722, and 724. Therefore, state 808 is also referred to herein as a dormant state of WCD 102.

WCD 102 transitions from idle state 808 back to active state 812 in response to an event 832, such as receiving a request to transmit or receive packet data (see step 724 of method 700). WCD 102 transitions from idle state 808 to idle state 806 in response to an event 834, such as when the Dual Dormancy Timer expires (tested at step 722 of method 700), causing the WCD 102 to handoff a data session from the second network to the first network (see step 730).

Network Capacity Considerations

Overall system capacity is expected to be improved by the ability to provide high speed packet data service on the IS-856 network, while providing voice, short messaging and low speed data services on the IS-2000 network.

The operation of WCDs in a given area is not expected to have any adverse impact on the capacity of an IS-2000 network. WCD 102 operates in accordance with the requirements specified in the IS-2000 standard. WCD 102 monitors the IS-2000 paging channel to receive incoming pages at all times when not active on the IS-2000 network.

The fact that WCD 102 monitors the IS-2000 paging channel even when active on an IS-856 system does imply an impact to the maximum throughput achievable by WCD 102. When monitoring the IS-2000 paging channel, WCD 102 must periodically tune away from the IS-856 network. During the time WCD 102 is monitoring the IS-2000 paging channel, the IS-856 network cannot schedule packets to WCD 102. The fraction of time that WCD 102 will be unavailable for packet data service on an IS-856 network depends on a slot cycle index (SCI) of the IS-2000 system being monitored, and the time required away from the IS-856 network to monitor an IS-2000 paging slot. In the event there is no page message for WCD 102 in the IS-2000 paging slot, the time WCD 102 is required to be away from the IS-856 system for that paging slot is expected to be approximately 100 milliseconds. Given the durations of the different IS-2000 slot cycles, this translates to the following ratios for the time WCD 102 will be available for packet data service on the IS-856 network:

SCI 0—92.2%

SCI 1—96.1%

SCI 2—98.0%.

The overall impact to the capacity of the IS-856 network depends on the number of users that are actively using the system. To avoid wasting forward link capacity of the IS-856 network, WCD 102 advertises a null data rate on the data rate control channel shortly before tuning away to the IS-2000 network. This ensures that the IS-856 network will not transmit packets to the WCD 102 in the time that the access terminal is unavailable to receive them. During this time, the IS-856 network is still able to schedule packets to other access terminals operating on the IS-856 network.

The effect on forward link capacity of the IS-856 system is minimal as long as there are enough access terminals active on the IS-856 network to allow packets to be scheduled to other access terminals in the time that a particular hybrid access terminal is monitoring the IS-2000 paging channel. The forward link capacity may be slightly reduced since WCD 102 may be unavailable for service at times when it would otherwise have the best link conditions of any access terminals on the system, and would therefore be the best candidate for service at that instant in time.

In the event that one hybrid access terminal is consuming the majority of the forward link throughput, there may be times when the forward link is idle when WCD 102 is monitoring the IS-2000 paging channel.

Call Setup Time Considerations

The call setup time for service on the IS-2000 network is expected to be unaffected by the dual system operation of WCD 102. Since WCD 102 performs slotted operation to monitor the IS-2000 paging channel at all times, call setup for mobile terminated services on the IS-2000 network will be the same as that for IS-2000 only access terminals. Call setup for mobile originated services on the IS-2000 network should also be the same as for IS-2000 only access terminals. Originations for the IS2000 network that are initiated while WCD 102 is active on the IS-856 network may be slightly delayed in order to close the active connection before tuning to the IS-2000 network.

The call setup time for service on the IS-856 network will vary depending on whether WCD 102 is already dormant on the IS-856 system. If WCD 102 is not dormant on the IS-856 network when an origination request is received for service on the IS-856 network, then a handoff from the IS-2000 network to the IS-856 network must be performed prior to establishing service. The time required for this handoff can vary and is described above. If WCD 102 is dormant on an IS-856 network when an origination request is received for service on the IS-856 network, then service on the IS-856 network can be initiated immediately.

Mobile Standby Time Considerations

The bounds on the achievable standby time of WCD 102 can be determined from the following factors:

access terminal (that is, WCD) sleep current;

access terminal receive current;

access terminal battery capacity;

receive time for IS-2000 paging slot;

receive time for IS-856 synchronous control capsule;

IS-2000 slot cycle index; and percent of time spent performing dual system slotted operation.

When performing slotted operation on the IS-2000 system only, WCD 102 can achieve the full standby time possible on an IS-2000 system. When performing dual system slotted operation to support dormancy on an IS-856 system, the achievable standby time is reduced from the full standby time achievable on an IS-2000 system. This reduction is mitigated by limiting the amount of time that WCD 102 is allowed to perform dual system slotted operation before returning to performing slotted operation on the IS-2000 system only.

When performing dual system slotted operation, the sleep timelines for the IS-2000 system and the IS-856 system are effectively overlaid. During slotted operation on the IS-2000 system, the WCD 102 receives the paging channel once every slot cycle. During slotted operation on the IS-856 system, the WCD 102 receives the synchronous control channel capsule in the designated control channel slot. The IS-856 control channel slot duration is 5.12 seconds, which is identical to the IS-2000 slot cycle index 2 slot duration.

As an example, assuming WCD 102 requires 100 milliseconds to receive either the IS-2000 paging channel slot or the IS-856 synchronous control channel capsule, the following table shows the percent of time the access terminal would spend in the low power sleep state for different values of the IS-2000 slot cycle index when performing IS-2000 slotted operation and dual system slotted operation.

EXAMPLE

Slotted Operation Sleep Duty Cycle

| SCI | IS-2000 only | Dual system |
| --- | --- | --- |
| 0 | 92.19% | 90.23% |
| 1 | 96.09% | 94.14% |
| 2 | 98.05% | 96.09% |

These numbers can be combined with the sleep current, receive current and battery capacity of the example access terminal to determine bounds on the total achievable standby time. Assuming an example access terminal with a sleep current of 1 milliamp, a receive current of 100 milliamps, and a battery capacity of 800 milliamp-hours, the following table shows the corresponding standby times that would be achievable for different values of the IS-2000 slot cycle index.

EXAMPLE
Slotted Operation Standby Time

| SCI | IS-2000 only | Dual system |
|---|---|---|
| 0 | 91.62 hrs | 74.96 hrs |
| 1 | 164.24 hrs | 117.62 hrs |
| 2 | 272.99 hrs | 164.24 hrs |

The "IS-2000 only" column in the above tables provides an example of an upper bound on sleep duty cycle and standby time that can be achieved if WCD 102 only performs slotted operation on the IS-2000 system while dormant. This upper bound on the standby time is achieved at the expense of connection setup time since IS-2000 to IS-856 handoff will be required for each packet data service connection.

The "Dual system" column in the above tables provides an example of a lower bound on the sleep duty cycle and standby time that corresponds to WCD 102 performing only dual system slotted operation while dormant. This type of operation allows faster connection setup times for packet data service on the IS-856 network, while also supporting IS-2000 voice and short message service, at the expense of overall standby time of the access terminal.

This type of calculation can be used as part of the tradeoff between access terminal standby time and packet data service connection setup time.

WCD Computer Controller

Features of the present invention can be performed and/or controlled by processor/controller 206, which in effect comprises a computer system. Such a computer system includes, for example, one or more processors that are connected to a communication bus (for example, data bus 220). Although telecommunication-specific hardware can be used to implement the present invention, the following description of a general purpose type computer system is provided for completeness.

The computer system can also include a main memory, preferably a random access memory (RAM), and can also include a secondary memory and/or other memory. The secondary memory can include, for example, a hard disk drive and/or a removable storage drive. The removable storage drive reads from and/or writes to a removable storage unit in a well known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

The computer system can also include a communications interface (for example, interfaces 212 and interfaces associated with devices 210). The communications interface allows software and data to be transferred between the computer system and external devices. Software and data transferred via the communications interface are in the form of signals that can be electronic, electromagnetic, optical or other signals capable of being received by the communications interface.

As depicted in FIG. 2, processor 206 is in communications with memory 208 for storing system and state tables 302 and 304 and record table 306, among other information not specifically mentioned. Processor 206, alone or in combination with transceiver 202, detects the various triggering events use to transition WCD 102 through its operational states, and to perform the methods of the present invention.

In this document, the terms "computer program medium" and "computer usable medium" are used to generally refer to media such as a removable storage device, a removable memory chip (such as an EPROM, or PROM) within WCD 102, and signals. Computer program products are means for providing software to the computer system.

Computer programs (also called computer control logic) are stored in the main memory and/or secondary memory. Computer programs can also be received via the communications interface. Such computer programs, when executed, enable the computer system to perform certain features of the present invention as discussed herein. For example, features of the flow charts depicted in FIGS. 4, 7, 7A and 7B, and of the WCD 102 operational state diagram 800 depicted in FIG. 8, can be implemented in such computer programs. In particular, the computer programs, when executed, enable processor 206 to perform and/or cause the performance of features of the present invention. Accordingly, such computer programs represent controllers of the computer system of WCD 102, and thus, controllers of the WCD 102. Thus, such computer programs control, for example, the interoperation of WCD 102 with the first and second networks, as described above.

Where the invention is implemented using software, the software can be stored in a computer program product and loaded into the computer system using the removable storage drive, the memory chips or the communications interface. The control logic (software), when executed by processor 206, causes processor 206 to perform certain functions of the invention as described herein.

Features of the invention may also or alternatively be implemented primarily in hardware using, for example, hardware components such as application specific integrated circuits (ASICs). Implementation of the hardware state machine so as to perform the functions described herein will be apparent to persons skilled in the relevant art(s).

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of establishing data sessions between a wireless communication device (WCD) and both of a first network supporting voice and data services and a second network supporting packet data services, comprising:

a. establishing a data session on the second network;

b. detecting a dormancy of the data session corresponding to a predetermined period of time that data is not being exchanged between the wireless communication device and the second network;

c. initiating a Dormancy time-out period in response to detecting the dormancy;

d. monitoring both a paging channel of the first network and a paging channel of the second network in response to detecting the dormancy; and e. monitoring only the first network paging channel when the Dormancy time-out period expires.

2. The method of claim 1, further comprising, between steps (a) and (b), the steps of:

exchanging data with the second network; and, concurrently monitoring the paging channel of the first network.

3. The method of claim 1, further comprising:

f. handing-off the data session from the second network to the first network when the Dormancy time-out period expires, to thereby establish a data session on the first network.

4. The method of claim 1, further comprising, after step (b):

transitioning the wireless communication device to a dormant state in response to detecting the dormancy; and performing step (d) while the wireless communication device is in the dormant state.

5. The method of claim 4, further comprising:

transitioning the wireless communication device from the dormant state to an active state in response to one of receiving a local request to exchange data with the second network, and receiving a page from the second network indicating the wireless communication device is to exchange data with the second network.

6. The method of claim 5, further comprising:

transitioning the wireless communication device out of the dormant state when the Dormancy time-out period expires.

7. The method of claim 6, further comprising, prior to step (a):

i. establishing the data session on the first network; and ii. detecting a request for a packet data service (PDS), wherein step (a) comprises handing-off the data session from the first network to the second network in response to detecting the PDS request, to thereby establish the data session on the second network.

8. The method of claim 7, further comprising, prior to step (i):

acquiring the first network; and monitoring only the first network paging channel.

9. The method of claim 1, wherein the first network is a voice and data network operating in accordance with IS-2000 voice and data specifications and the second network is a high data rate (HDR) network operating in accordance with IS-856 packet data specifications.

10. A method of establishing data sessions between a wireless communication device (wireless communication device) and both of a first network supporting voice and data services and a second network supporting packet data services, comprising:
   a. acquiring the first network;
   b. monitoring the first network for paging messages;
   c. establishing a data session on the first network;
   d. detecting a request for a packet data service (PDS);
   e. handing-off the data session from the first network to the second network in response to detecting the PDS request, to thereby establish the data session on the second network;
   f. transitioning the wireless communication device to an active state on the second network to send or receive a data packet in response to receiving a request to send or receive the data packet.
   g. detecting a dormancy of the data session corresponding to a predetermined period of time that data is not being exchanged between the wireless communication device and the second network;
   h. transitioning the wireless communication device to a dormant state and initiating a Dormancy time-out period when the dormancy is detected in step (g); and
   i. monitoring both the first network and the second network for paging messages while the wireless communication device is in the dormant state.

11. The method of claim 10, further comprising the step of monitoring the first network for paging messages while the wireless communication device is in the active state.

12. The method of claim 10, further comprising:
   j. repeating steps (f) through (i).

13. The method of claim 10, further comprising:
   j. transitioning the wireless communication device from the dormant state to an idle state when the Dormancy time-out period expires; and
   k. monitoring only the first network for paging messages when the wireless communication device is in the idle state.

14. A wireless communication device capable of establishing data sessions on both a first network supporting voice and data services and a second network supporting packet data services, comprising:
   means for establishing a data session on the second network;
   means for detecting a dormancy of the data session corresponding to a predetermined period of time that data is not being exchanged between the wireless communication device and the second network;
   a Dormancy Timer;
   means for initiating the Dormancy Timer in response to detecting the dormancy;
   means for monitoring both a paging channel of the first network and a paging channel of the second network in response to detecting the dormancy; and
   means, responsive to the Dormancy Timer, for monitoring only the first network paging channel when the Dormancy Timer expires.

15. The wireless communication device of claim 14, further comprising means for exchanging data with the second network and for concurrently monitoring the paging channel of the first network.

16. The wireless communication device of claim 14, further comprising:
   means for handing-off the data session from the second network to the first network when the Dormancy Timer expires, to thereby establish the data session on the first network.

17. The wireless communication device of claim 14, further comprising
   means for transitioning the wireless communication device to a dormant state when the detecting means detects the dormancy, wherein the monitoring means monitors both the paging channel of the first network and the paging channel of the second network when the wireless communication device is in the dormant state.

18. The wireless communication device of claim 17, further comprising:
   means for transitioning the wireless communication device from the dormant state to an active state of the wireless communication device responsive to either
      a local request to exchange data with the second network, or
      a page from the second network indicating the wireless communication device is to exchange data with the second network.

19. The wireless communication device of claim 18, further comprising:
   means for transitioning the wireless communication device out of the dormant state when the Dormancy Timer expires.

20. The wireless communication device of claim 19, further comprising:
   means for establishing the data session on the first network prior to the means for establishing a data session on the second network establishing the data session on the second network; and
   means for detecting a request for a packet data service (PDS) after the means for establishing the data session on the first network establishes the data session on the first network,
   wherein the means for establishing the data session on the second network includes means for handing-off the data session from the first network to the second network when the PDS request is detected.

21. The wireless communication device of claim 20, further comprising:
   means for acquiring the first network; and
   means for monitoring only the first network paging channel.

22. The wireless communication device of claim 14, wherein the first network is a voice and data network operating in accordance with IS-2000 voice and data specifications and the second network is a high data rate (HDR) network operating in accordance with IS-856 packet data specifications. .

23. A computer program product comprising a computer usable medium having control logic stored therein for causing a processor of a wireless communication device (WCD) to control the wireless communication device, such that the wireless communication device is capable of establishing data sessions on both a first network supporting voice and data services and a second network supporting packet data services, the control logic comprising:
   first computer readable program code means for causing the processor to establish a data session on the second network;
   second computer readable program code means for causing the processor to detect a dormancy of the data session corresponding to a predetermined period of time that data is not being exchanged between the wireless communication device and the second network;

third computer readable program code means for causing the processor to initiate a Dormancy time-out period when the dormancy is detected;

fourth computer readable program code means for causing the processor to monitor both a paging channel of the first network and a paging channel of the second network when the dormancy is detected; and fifth computer readable program code means for causing the processor to monitor only the first network paging channel when the Dormancy time-out period expires.

24. The computer program product of claim 23, further comprising:

sixth computer readable program code means for causing the processor to exchange data with the second network and for causing the processor to concurrently monitor the paging channel of the first network.

25. The computer program product of claim 23, wherein the first computer readable program code means includes computer readable program code means for causing the processor to handoff the data session from the second network to the first network when the Dormancy time-out period expires, to thereby establish the data session on the first network.

26. The computer program product of claim 23, further comprising:

sixth computer readable program code means for causing the processor to transition the wireless communication device to a dormant state when the dormancy is detected, wherein the fifth computer readable program code means includes computer readable program code means for causing the computer to monitor both the paging channel of the first network and the paging channel of the second network when the wireless communication device is in the dormant state.

27. The computer program product of claim 26, further comprising:

seventh computer readable program code means for causing the processor to transition the wireless communication device from the dormant state to an active state of the wireless communication device responsive to either a local request to exchange data with the second network, or a page from the second network indicating the wireless communication device is to exchange data with the second network.

28. The computer program product of claim 27, further comprising:

eighth computer readable program code means for causing the processor to transition the wireless communication device out of the dormant state when the Dormancy time-out period expires.

29. The computer program product of claim 28, further comprising:

ninth computer readable program code means for causing the processor to establish the data session on the first network prior to the first computer readable program code means establishing the data session on the second network;

tenth computer readable program code means for causing the processor to detect a request for a packet data service (PDS) after the data session is established on the first network; and eleventh computer readable program code means for causing the processor to handoff the data session from the first network to the second network when the means PDS request is detected.

30. The computer program product of claim 29, further comprising:

twelfth computer readable program code means for causing the processor to acquire the first network; and thirteenth computer readable program code means for causing the processor to monitor only the first network paging channel.

31. The computer program product of claim 23, wherein the first network is a voice and data network operating in accordance with IS-2000 voice and data specifications and the second network is a high data rate (HDR) network operating in accordance with IS-856 packet data specifications.

* * * * *